United States Patent Office 2,839,072
Patented June 17, 1958

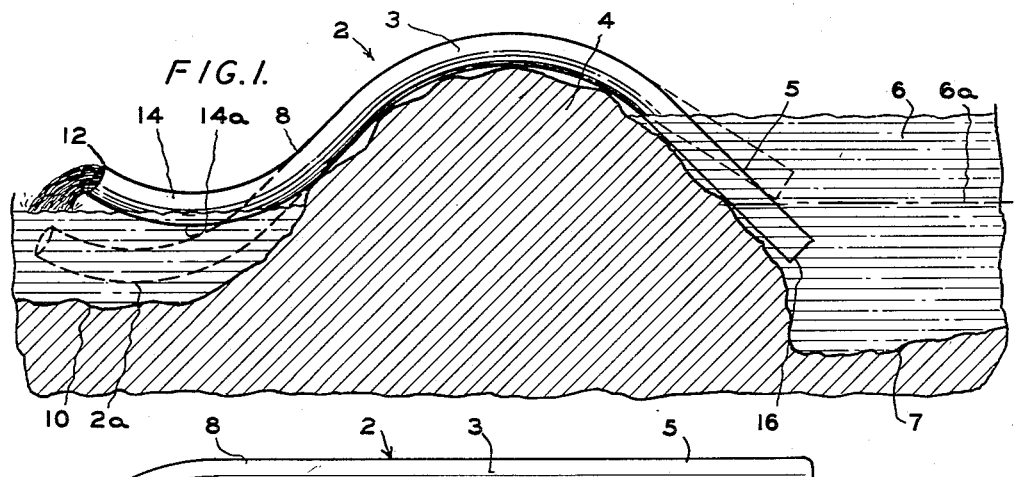
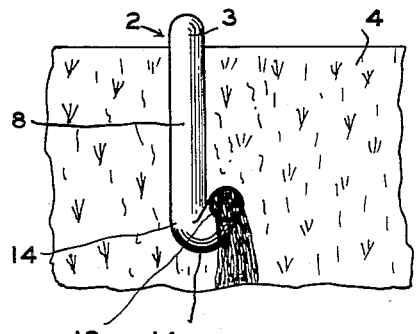
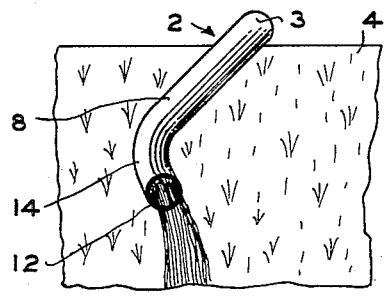
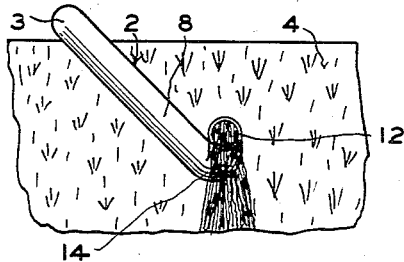

2,839,072

IRRIGATION SIPHONS

Manuel M. Leyva, Peoria, Ariz.

Application January 31, 1955, Serial No. 485,188

1 Claim. (Cl. 137—146)

This invention pertains to irrigation siphons of the type used to divert water from ditches running along the upper edge of a field into the small ditches or lands of the field.

Heretofore these siphons have been made of metal bent somewhat U or V shape. One of the ends has heretofore been made longer than the other and was considered to be the output end. Sometimes the output end has been made long enough so that there was a horizontal extension which was used to carry the water away from the ditch bank toward the field so that it would not form a puddle adjacent the ditch bank. Later siphons were made with upturned ends. This was an attempt to keep the siphon from running dry in case the water in the feed ditch dropped to a lower level than when the siphon was started. Numerous difficulties attended the use of these siphons with upturned ends, and they have not been generally successful.

One of the objects of my improved siphon is to provide a structure made of tubing bent in an inverted U-shape to extend over a ditch bank and siphon water from the ditch to a point beyond the bank of the ditch; the siphon having U-shaped trap at its outlet end, with a lateral offset provided for the outlet.

Another object is to provide an inverted U-shaped siphon, for the purposes mentioned, having a U-shaped trap with an offset outlet end disposed so that when the body of the siphon is tilted laterally the outlet end moves eccentrically relative to the bottom of the trap so that when the outlet end is raised air will not enter the trap and break the prime of the siphon.

Another object is to provide a siphon with a U-shaped trap at its outlet end with a transverse offset so that the flow of water through the siphon can be controlled by lateral tilting adjustment of the body of the siphon on the top of the ditch bank; thus flow may be varied through the siphons.

Since it is common practice for irrigators to prime siphons of this type by grasping the siphon near its outlet end with one hand and, using the palm of the other hand as a valve plug closing on the outlet end, oscillating the siphon longitudinally with the inlet end immersed in the water of the ditch so that water is intermittently admitted into the siphon and retained by valve action of the palm of the hand while air is expelled, it is a further object of the invention to provide a siphon with a trap and offset outlet end, as above stated, and with an uncurved inlet end so that prime may be effected as above mentioned and without the necessity of immersing the siphon in the water and then lifting the filled siphon up and over the ditch bank.

Other objects will appear hereinafter.

I attain the foregoing objects by means of the construction and peculiar shape and formation of the siphon tube shown in the accompanying drawings in which—

Figure 1 is a side elevation of a siphon incorporating my improvements as applied to an irrigation ditch bank;

Figure 2 is a plan view thereof;

Figure 3 is an elevation of the outlet end of the siphon with the body in vertical position;

Figure 4 is an end elevational view of the siphon with the central body portion tilted opposite to the offset to diminish flow and render the trap operative; and Figure 5 is a similar end view showing the siphon with the body tilted in the direction of the offset to provide full flow of water through it.

Similar numerals refer to similar parts in the several views.

The body of the siphon 2 is generally U-shaped and is inverted and disposed so that the elevated central portion 3 will lie over ditch bank 4 while the intake end 5 dips into the water 6 in ditch 7, and the outlet end 8 extends over the ditch bank and below the intake to discharge water into the field to be irrigated indicated by numeral 10.

The entire siphon body is preferably made of light metal tubing, which has sufficient strength so that it will not collapse or bend while in use. The outlet end 8 is bent somewhat upward so that a trap 14 is formed as shown in Figure 1. The end 8 is offset to the right so that the outlet opening 12 is offset and somewhat elevated when the mid-body portion is vertical as shown in Figure 3. This offset, combined with the upturned end causes the end opening 12 to move eccentrically relative to the bottom 14a of the trap 14 when the body of the siphon is tilted so that it lies at an angle to the vertical as shown in Figures 4 and 5. In Figure 4 the top portion 3 of the siphon body is disposed somewhat to the left of vertical. That is, it is tilted in a direction away from the offset. This moves the tip end 12 to an elevated position, activates the trap, and water within the siphon body is trapped and retained so long as the inlet opening 16 is under water in ditch 7. This position, since it tends to elevate the outlet opening 12, also tends to diminish the flow through the siphon by bringing the tip end toward the level of the water 6 in ditch 7. If this elevation is in the same plane as the level of water 6 in ditch 7 the flow may be entirely shut off, but the water will remain in the siphon and it will be ready to flow again whenever the level in the ditch rises, or when the body of the siphon is tilted to the right as shown in Figure 5.

In this latter position, since the end opening 12 is lowered the differential in levels between the water in the ditch and the end opening will produce maximum flow.

It is to be understood that when the siphon body is tilted to the left, as shown in Figure 4, and if the level of water 6 drops as indicated by dotted line 6a, then the flow will cease but water will be retained in trap 14 and the prime in body 2 will be retained so long as the inlet tip 16 remains immersed in water 6. This condition often happens due to irregularities of flow in the feed ditch. Such irregularities are common in irrigation practice due to opening and closing headgates, adding additional siphons, or setting up tarpaulins for intermediate dams to temporarily back up water in the ditch and raise its level.

It is therefore unnecessary for the irrigator to reprime this siphon under these conditions, whereas with an ordinary siphon the prime will break whenever the flow diminishes because air will enter the outlet unless it is flowing full of water.

On the contrary, this siphon will be ready to restart the flow whenever the level of the water 6 rises in the ditch. Thus, constant attention to the maintenance of the prime in the siphon is unnecessary.

Full flow may be obtained by tilting to the right, as above mentioned and also by sliding the body 2 longitudinally over the ditch bank as indicated by dotted outline 2a, Figure 1. Sliding toward the outlet end lowers the outlet end opening 12, and increases flow. The inlet end 16, obviously must remain below the surface of water 6 and therefore, it is made straight and unbent and extends downwardly and at an angle away from the central portion or hump 3 of the siphon body. This shape also permits the siphon to be primed by to and fro movement, as is the preferred practice, without immersion, filling and lifting.

It is to be understood the U-shaped bend of body 2, while it forms the raised central portion 3 and downwardly and outwardly diverging end portions or legs 5 and 8, is generally and for the most part planar and in one plane. The lateral bend which offsets the end 8 carries this outlet end portion out of this plane. The offset is about the diameter of the tubing. The bottom of trap 14 is preferably in about the same horizontal plane (as the inlet end 5), although this is not critical.

Whereas I have specified that metal tubing is used, it is to be understood that organic plasticisable materials having equivalent properties may be used.

In its preferred form the end or leg portions extend outward from the central portion at angles of 55°. This is not critical and the angles may be widely varied.

I claim:

An irrigation siphon for removing water from irrigation ditches of the type having banks with sloping sides, comprising an elongated tubular body of uniform diameter substantially throughout its length bent intermediate its ends to have substantially a U-shape providing a central portion and end portions forming legs extending from said central portion outwardly and forming an obtuse angle substantially conforming to the slope of a ditch bank on which the siphon is to be used, one of said legs being a straight section and providing an intake opening for the siphon, and the other leg having a straight section and an outlet section formed by a goose-neck trap bend disposed out of the plane of said straight sections.

References Cited in the file of this patent

UNITED STATES PATENTS

| | | |
|---|---|---|
| 378,811 | Tyler | Feb. 28, 1888 |
| 1,308,928 | Carlson | July 8, 1919 |
| 2,435,049 | Minges | Jan. 27, 1948 |
| 2,791,232 | Downs | May 7, 1957 |